United States Patent
Tang et al.

(10) Patent No.: US 12,557,029 B2
(45) Date of Patent: Feb. 17, 2026

(54) UPLINK POWER DISTRIBUTION METHOD AND DEVICE, STORAGE MEDIUM, AND TERMINAL

(71) Applicant: SPREADTRUM COMMUNICATIONS (SHANGHAI) CO., LTD., Shanghai (CN)

(72) Inventors: Huanhua Tang, Shanghai (CN); Dayan Wu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 595 days.

(21) Appl. No.: 17/919,430

(22) PCT Filed: Apr. 7, 2021

(86) PCT No.: PCT/CN2021/085763
§ 371 (c)(1),
(2) Date: Oct. 17, 2022

(87) PCT Pub. No.: WO2021/208781
PCT Pub. Date: Oct. 21, 2021

(65) Prior Publication Data
US 2023/0156611 A1     May 18, 2023

(30) Foreign Application Priority Data
Apr. 17, 2020   (CN) .......................... 202010307168.2

(51) Int. Cl.
*H04W 52/26* (2009.01)
*H04W 52/14* (2009.01)
(Continued)

(52) U.S. Cl.
CPC ......... *H04W 52/146* (2013.01); *H04W 52/28* (2013.01); *H04W 52/367* (2013.01)

(58) Field of Classification Search
CPC ................................ H04L 12/28; H04L 12/50
(Continued)

(56) References Cited

U.S. PATENT DOCUMENTS

2014/0369324 A1   12/2014   Lin et al.
2017/0223694 A1   8/2017    Han et al.
(Continued)

FOREIGN PATENT DOCUMENTS

CN     107925969 A     4/2018
CN     110167123 A     8/2019
(Continued)

OTHER PUBLICATIONS

AT&T, "Power Control for Option 4 DC", 3GPP TSG-RAN WG1 Meeting #94, R1-1809075, Aug. 20-24, 2018, 3 pages.
(Continued)

*Primary Examiner* — Dang T Ton
(74) *Attorney, Agent, or Firm* — CANTOR COLBURN LLP

(57) ABSTRACT

A method and an apparatus for allocating uplink power, a storage medium, and a terminal are provided. In the method, an overlapping set is determined for a first uplink channel; priorities of the uplink channels in the overlapping set are determined at least based on channel types, information carried in uplink signals, carrier types and periods of the uplink channels in a case that a sum of uplink powers of the uplink channels in the overlapping set is greater than a predetermined maximum total transmission power; the uplink powers of the uplink channels in the overlapping set are adjusted based on the priorities until the sum of the uplink powers of the uplink channels in the overlapping set is less than or equal to the predetermined maximum total transmission power; and an uplink power of the first uplink channel is updated based on an adjustment result.

12 Claims, 2 Drawing Sheets

(51) Int. Cl.
*H04W 52/28* (2009.01)
*H04W 52/36* (2009.01)

(58) Field of Classification Search
USPC ............................... 370/329, 401, 402, 403
See application file for complete search history.

(56) References Cited

U.S. PATENT DOCUMENTS

| 2018/0279227 | A1 | 9/2018 | Kim et al. | |
|---|---|---|---|---|
| 2019/0132803 | A1* | 5/2019 | Kim | H04W 52/14 |
| 2020/0163023 | A1 | 5/2020 | Pelletier et al. | |
| 2020/0374808 | A1 | 11/2020 | Zhang et al. | |

FOREIGN PATENT DOCUMENTS

| CN | 110741693 A | 1/2020 | |
|---|---|---|---|
| CN | 111511005 A | 8/2020 | |
| WO | WO-2018175784 A1 * | 9/2018 | ........... H04B 7/0617 |
| WO | 2020061774 A1 | 4/2020 | |
| WO | 2020072877 A1 | 4/2020 | |

OTHER PUBLICATIONS

International Search Report for International Application No. PCT/CN2021/085763; Date of Mailing, Jul. 7, 2021.

* cited by examiner

UPLINK POWER DISTRIBUTION METHOD AND DEVICE, STORAGE MEDIUM, AND TERMINAL

CROSS REFERENCE TO RELATED APPLICATIONS

This application is the national phase of International Patent Application No. PCT/CN2021/085763, titled "UPLINK POWER DISTRIBUTION METHOD AND DEVICE, STORAGE MEDIUM, AND TERMINAL", filed on Apr. 7, 2021. Priority under 35 U.S.C. § 119 (a) and 35 U.S.C. § 365 (b) is claimed from Chinese Patent Application No. 202010307168.2, titled "UPLINK POWER DISTRIBUTION METHOD AND DEVICE, STORAGE MEDIUM, AND TERMINAL", filed on Apr. 17, 2020 with the China National Intellectual Property Administration, both of which are incorporated herein by reference in their entireties.

FIELD

The present disclosure relates to the technical field of communication, and in particular to a method for allocating uplink power, an apparatus for allocating uplink power, a storage medium and a terminal.

BACKGROUND

Generally, in simultaneously performing NR uplink transmission and performing Long Term Evolution (LTE) uplink transmission in a Non-Standalone (NSA) operation mode, for an overlap of the NR uplink transmission signal and the LTE uplink transmission signal, a New Radio (NR) terminal may adjust the NR uplink transmission power (which may be referred to as uplink power) for the overlap to ensure that the sum of the NR uplink transmission power and the LTE uplink transmission power does not exceed a predetermined range.

In the NSA operation mode, the NR uplink transmission and the LTE uplink transmission are performed in two scenarios: an EN-DC scenario and an NE-DC scenario. In the EN-DC scenario, a dual connectivity, with a radio access network based on the fourth generation (4G) mobile communication technology and with a 5G NR, is realized, that is, an E-UTRA NR dual connectivity with a master cell group (MCG) using Evolved Universal Terrestrial Radio Access (E-UTRA) and a secondary cell group (SCG) using NR is realized. In the NE-DC scenario, a dual connectivity with a 5G NR and a 4G radio access network is realized, that is, an E-UTRA NR dual connectivity with an MCG using NR and an SCG using E-UTRA is realized.

Both in the EN-DC scenario and in the NE-DC scenario, in a case that there is an overlap between the NR uplink transmission signal and the LTE uplink transmission signal and a sum of the NR uplink transmission power for the overlap and the LTE uplink transmission power for the overlap exceeds a limit, the NR uplink transmission power for the overlap is unconditionally reduced, and the NR transmission is even abandoned if the NR uplink transmission power is reduced a lot. However, if transmission is performed on an important channel (such as a Physical Random Access Channel (PRACH)) in NR, the connection performance of the NR link is greatly affected by the reducing the NR uplink transmission power or even abandoning the NR transmission. Specifically, the connection performance of the NR link in a Radio Resource Control (RRC) connection state may be reduced or even deteriorated, and the NR network even cannot be stayed or dropping from the NR network may happen in severe cases.

SUMMARY

According to the present disclosure, the technical problem of how to optimize a strategy for allocating an NR transmission power and an LTE transmission power in an NSA operation mode to improve connection performance of an NR link in an RRC connection state is solved.

To solve the above technical problem, a method for allocating uplink power is provided according to an embodiment of the present disclosure. The method includes: determining an overlapping set for a first uplink channel to be used for transmission, where the overlapping set is a set of uplink channels overlapping in time with the first uplink channel, and at least one of the uplink channels overlapping in time with the first uplink channel belongs to a different communication system from the first uplink channel; determining priorities of the uplink channels in the overlapping set at least based on channel types, information carried in uplink signals, carrier types and periods of the uplink channels in a case that a sum of uplink powers of the uplink channels in the overlapping set is greater than a predetermined maximum total transmission power; adjusting the uplink powers of the uplink channels in the overlapping set based on the priorities until the sum of the uplink powers of the uplink channels in the overlapping set is less than or equal to the predetermined maximum total transmission power, where an uplink power of an uplink channel with a lower priority is adjusted with a larger adjustment amount; and updating an uplink power of the first uplink channel based on an adjustment result.

In an embodiment, an uplink power of an uplink channel with a higher priority is adjusted with an adjustment amount closer to zero.

In an embodiment, the adjusting the uplink powers of the uplink channels in the overlapping set based on the priorities until the sum of the uplink powers of the uplink channels in the overlapping set is less than or equal to the predetermined maximum total transmission power includes: determining a remaining allocatable uplink power based on a uplink power of an uplink channel with a highest priority and the predetermined maximum total transmission power; and adjusting uplink powers of remaining uplink channels in the overlapping set except the uplink channel with the highest priority based on the remaining allocatable uplink power to control a sum of the uplink powers of the remaining uplink channels to be less than or equal to the remaining allocatable uplink power.

In an embodiment, in a case that there are multiple overlapping sets in which a sum of uplink powers of uplink channels is greater than the predetermined maximum total transmission power, the adjusting the uplink powers of the uplink channels in the overlapping set based on the priorities until the sum of the uplink powers of the uplink channels in the overlapping set is less than or equal to the predetermined maximum total transmission power includes: determining a minimum uplink power of the first uplink channel in adjustment results of the multiple overlapping sets as an updated uplink power of the first uplink channel.

In an embodiment, the method for allocating uplink power further includes: determining, for each of uplink channels in the multiple overlapping sets except the first uplink channel, a minimum uplink power of the uplink channel in the multiple overlapping sets as an updated uplink power of the uplink channel.

In an embodiment, the determining priorities of the uplink channels in the overlapping set at least based on channel types, information carried in uplink signals, carrier types and periods of the uplink channels includes: determining that a PRACH has a highest priority, a PUCCH has a second highest priority and a PUSCH has a lowest priority; determining that an uplink channel on which an uplink signal carries an HARQ-ACK and/or an uplink scheduling request has a highest priority, an uplink channel on which an uplink signal carries CSI has a second highest priority, and an uplink channel on which an uplink signal carries none of the HARQ-ACK, the uplink scheduling request and the CSI has a lowest priority; determining that an aperiodic uplink channel has a highest priority, a semi-static uplink channel has a second highest priority, and a static uplink channel has a lowest priority; and determining that an uplink channel corresponding to a primary cell in carrier aggregation has a highest priority, an uplink channel corresponding to a primary-secondary cell in carrier aggregation has a second highest priority, and an uplink channel corresponding to a secondary cell in carrier aggregation has a lowest priority.

In an embodiment, the determining priorities of the uplink channels in the overlapping set at least based on channel types, information carried in uplink signals, carrier types and periods of the uplink channels further includes: for uplink channels having a same channel type, same information carried in uplink signals, a same carrier type and/or a same period, determining priorities of the uplink channels based on a scenario in which a current uplink transmission scenario is performed, where the scenario includes an NE-DC scenario and an EN-DC scenario.

In an embodiment, the determining priorities of the uplink channels based on a scenario in which a current uplink transmission is performed includes: priorities of the uplink channels based on a scenario in which a current uplink transmission is performed, determining that a priority of an uplink channel belonging to an NR communication system in the uplink channels is higher than a priority of an uplink channel belonging to an LTE communication system in the uplink channels in a case that the scenario in which the current uplink transmission is performed is the NE-DC scenario, and determining that a priority of an uplink channel belonging to an LTE communication system in the uplink channels is higher than a priority of an uplink channel belonging to an NR communication system in the uplink channels in a case that the scenario in which the current uplink transmission is performed is the EN-DC scenario.

In an embodiment, the updating an uplink power of the first uplink channel based on an adjustment result includes: determining the uplink power of the first uplink channel determined based on the adjustment result as an adjusted uplink power, and determining a ratio of the adjusted uplink power to an initial uplink power of the first uplink channel as a power adjustment coefficient of the first uplink channel; finely adjusting the power adjustment coefficient based on uplink powers of the first uplink channel in a previous time slot or subframe and a subsequent time slot or subframe to control the uplink power of the first uplink channel to change smoothly in time; and updating the uplink power of the first uplink channel based on the adjusted power adjustment coefficient.

To solve the above technical problem, an apparatus for allocating uplink power is provided according to an embodiment of the present disclosure. The apparatus includes: a determination module, a priority determination module, an allocation module and an updating module. The determination module is configured to determine an overlapping set for a first uplink channel, where the overlapping set is a set of uplink channels overlapping in time with the first uplink channel, and at least one of the uplink channels overlapping in time with the first uplink channel belongs to a different communication system from the first uplink channel. The priority determination module is configured to determine priorities of the uplink channels in the overlapping set at least based on channel types, information carried in uplink signals, carrier types and periods of the uplink channels in a case that a sum of uplink powers of the uplink channels in the overlapping set is greater than a predetermined maximum total transmission power. The allocation module is configured to adjust the uplink powers of the uplink channels in the overlapping set based on the priorities until the sum of the uplink powers of the uplink channels in the overlapping set is less than or equal to the predetermined maximum total transmission power, where an uplink power of an uplink channel with a lower priority is adjusted with a larger adjustment amount. The updating module is configured to update an uplink power of the first uplink channel based on an adjustment result.

To solve the above technical problem, a storage medium is provided according to an embodiment of the present disclosure. The storage medium stores computer instructions. The computer instructions, when executed by a processor, cause the processor to perform the method described above.

To solve the above technical problem, a terminal is provided according to an embodiment of the present disclosure. The terminal includes the apparatus for allocating uplink power, or includes a processor and a memory. The memory stores computer instructions that are executable on the processor. The processor is configured, when executing the computer instructions, to perform the method described above.

Compared with the conventional technology, the technical solutions according to the embodiments of the present disclosure have the following advantageous effects.

According to the embodiments of the present disclosure, a method for allocating uplink power is provided. The method includes: determining an overlapping set for a first uplink channel to be used for transmission, where the overlapping set is a set of uplink channels overlapping in time with the first uplink channel, and at least one of the uplink channels overlapping in time with the first uplink channel belongs to a different communication system from the first uplink channel; determining priorities of the uplink channels in the overlapping set at least based on channel types, information carried in uplink signals, carrier types and periods of the uplink channels in a case that a sum of uplink powers of the uplink channels in the overlapping set is greater than a predetermined maximum total transmission power; adjusting the uplink powers of the uplink channels in the overlapping set based on the priorities until the sum of the uplink powers of the uplink channels in the overlapping set is less than or equal to the predetermined maximum total transmission power, where an uplink power of an uplink channel with a lower priority is adjusted with a larger adjustment amount; and updating an uplink power of the first uplink channel based on an adjustment result.

Compared with that the NR uplink transmission power for the overlap is unconditionally reduced or the NR transmission is even abandoned in the NSA operation mode according to the conventional technology, with the solutions according to the embodiments of the present disclosure, in the case that there is an overlap between the NR uplink transmission signal and the LTE uplink transmission signal and the sum of the NR uplink transmission power for the overlap and the LTE uplink transmission power for the overlap exceeds the limit, the NR terminal respectively evaluates the type and the importance of the NR uplink transmission channel for the overlap and the type and the importance of the LTE uplink transmission channel for the overlap, and then optimally allocates the NR uplink transmission power and the LTE uplink transmission power. Therefore, the influence on the connection performance of the NR link in a RRC connection state can be reduced without affecting the connection performance of the LTE link in a RRC connection state. Specifically, the uplink channels belonging to the LTE communication system and the uplink channels belonging to the NR communication system in the overlapping set are sorted based on factors such as channel types, ensuring that the uplink powers of the NR uplink channels and the uplink powers of the LTE uplink channels carrying signaling related to link connection performance can be effectively guaranteed, and thereby avoiding always reducing the connection performance of the NE link in order to ensure the connection performance of the LTE link.

DETAILED DESCRIPTION

Figure 1:
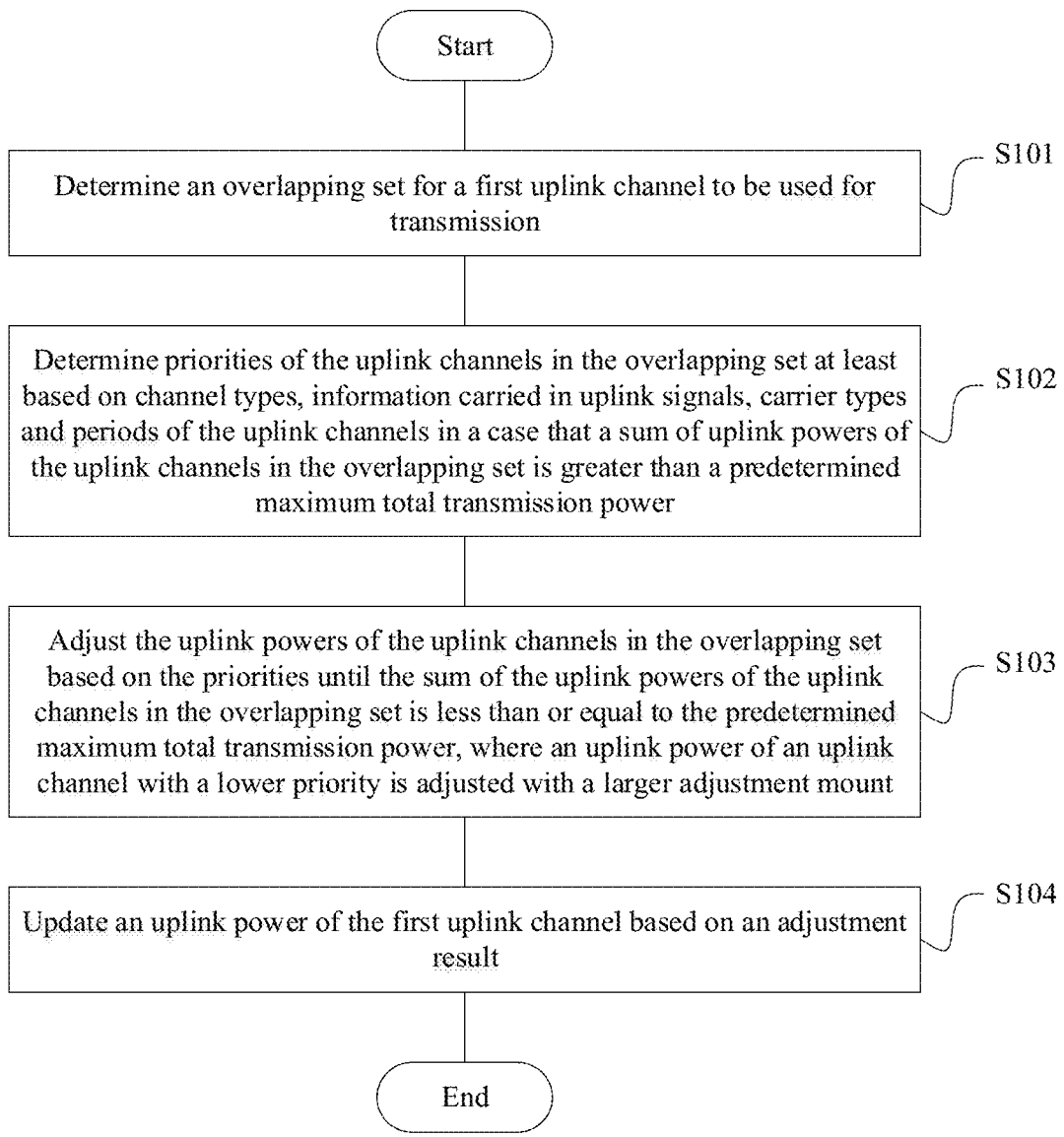
FIG. 1 is a flowchart of a method for allocating uplink power according to an embodiment of the present disclosure.

As mentioned in the background art, the conventional strategy for allocating the NR uplink transmission power and the LTE uplink transmission power in the NSA operation mode has defects, seriously affecting the connection performance of the NR link in a RRC connection state.

Specifically, in simultaneously performing NR uplink transmission and performing LTE uplink transmission by a mobile communication terminal in an NSA operation mode, a transmission power and timing are respectively configured for the NR uplink transmission and the LTE uplink transmission. In a case that there is an overlap between the NR uplink transmission signal and the LTE uplink transmission signal and a sum of the NR uplink transmission power for the overlap and the LTE uplink transmission power for the overlap exceeds a limit, the NR uplink transmission power for the overlap is processed according to the conventional technology.

According to the conventional technology, the following processing is performed. Based on the 3rd Generation Partnership Project (3GPP) protocols 38.213 and 38.101-3, a maximum sum of the NR transmission power and the LTE transmission power in the NSA operation mode is predetermined, which is represented as $\hat{P}_{Total}^{EN-DC}$ in the EN-DC scenario and is represented as $\hat{P}_{Total}^{EN-DC}$ in the NE-DC scenario. When a sum of the NR transmission power for the overlap and the LTE transmission power for the overlap exceeds the predetermined maximum sum, the NR transmission power is directly reduced. Moreover, in the EN-EC scenario, the NR transmission may be directly abandoned if the NR transmission power is reduced by more than $X_{SCALE}$.

However, since the channel in the NR uplink transmission may be important, the connection performance of the NR link in a RRC connection state may be reduced by directly reducing the NR transmission power or even abandoning the NR transmission, and the NR network even cannot be stayed or dropping from the NR network may happen in severe cases.

To solve the above technical problems, a method for allocating uplink power is provided according to the embodiments of the present disclosure. The method includes: determining an overlapping set for a first uplink channel to be used for transmission, where the overlapping set is a set of uplink channels overlapping in time with the first uplink channel, and at least one of the uplink channels overlapping in time with the first uplink channel belongs to a different communication system from the first uplink channel; determining priorities of the uplink channels in the overlapping set at least based on channel types, information carried in uplink signals, carrier types and periods of the uplink channels in a case that a sum of uplink powers of the uplink channels in the overlapping set is greater than a predetermined maximum total transmission power; adjusting the uplink powers of the uplink channels in the overlapping set based on the priorities until the sum of the uplink powers of the uplink channels in the overlapping set is less than or equal to the predetermined maximum total transmission power, where an uplink power of an uplink channel with a lower priority is adjusted with a larger adjustment amount; and updating an uplink power of the first uplink channel based on an adjustment result. The first uplink channel to be used for transmission means that the first uplink channel is prepared for transmission. Different communication systems adopt different communication protocols. For example, an LTE communication system and an NR communication system are different communication systems.

According to the solutions according to the embodiments of the present disclosure, in the case that there is an overlap between the NR uplink transmission signal and the LTE uplink transmission signal and the sum of the NR uplink transmission power for the overlap and the LTE uplink transmission power for the overlap exceeds the limit, the NR terminal respectively evaluates the type and the importance of the NR uplink transmission channel for the overlap and the type and the importance of the LTE uplink transmission channel for the overlap, and then optimally allocates the NR uplink transmission power and the LTE uplink transmission power. Therefore, the influence on the connection performance of the NR link in a RRC connection state can be reduced without affecting the connection performance of the LTE link in a RRC connection state. Specifically, the uplink channels belonging to the LTE communication system and the uplink channels belonging to the NR communication system in the overlapping set are sorted based on factors such as channel types, ensuring that the uplink powers of the NR uplink channels and the uplink powers of the LTE uplink channels carrying signaling related to link connection performance can be effectively guaranteed, and thereby avoiding always reducing the connection performance of the NE link in order to ensure the connection performance of the LTE link.

In order to enable the above objects, features and advantageous effects of the present disclosure to be more clearly understood, the embodiments of the present disclosure are to be described in detail hereinafter with reference to the accompanying drawings.

FIG. 1 is a flowchart of a method for allocating uplink power according to an embodiment of the present disclosure.

The solution according to the embodiment of the present disclosure may be applied to an application scenario in which NR transmission and LTE transmission are performed simultaneously in an NSA operation mode. Specifically, the scenario may include an NE-DC scenario and an EN-DC scenario.

The solution according to the embodiment of the present disclosure may be performed by a user device, such as an NR terminal, in the above scenarios. In a case that there is an overlap between the NR uplink transmission signal and the LTE uplink transmission signal and the sum of the NR uplink transmission power for the overlap and the LTE uplink transmission power for the overlap exceeds a limit, the influence on the connection performance of the NR link can be reduced with ensuring the connection performance of the LTE link.

In an embodiment, the method for allocating uplink power including the following steps S101 to S104 may be performed by a chip with a power allocation function in the user device, or may be performed by a baseband chip in the user device.

Referring to FIG. 1, the method for allocating uplink power according to the embodiment of the present disclosure may include steps S101 to S104.

In step S101, an overlapping set is determined for a first uplink channel to be used for transmission. The overlapping set is a set of uplink channels overlapping in time with the first uplink channel. At least one of the uplink channels overlapping in time with the first uplink channel belongs to a different communication system from the first uplink channel.

In step S102, priorities of the uplink channels in the overlapping set are determined at least based on channel types, information carried in uplink signals, carrier types and periods of the uplink channels in a case that a sum of uplink powers of the uplink channels in the overlapping set is greater than a predetermined maximum total transmission power.

In step S103, the uplink powers of the uplink channels in the overlapping set are adjusted based on the priorities until the sum of the uplink powers of the uplink channels in the overlapping set is less than or equal to the predetermined maximum total transmission power. An uplink power of an uplink channel with a lower priority is adjusted with a larger adjustment amount.

In step S104, an uplink power of the first uplink channel is updated based on an adjustment result.

In an embodiment, in the step S101, before performing transmission on an NR uplink channel or on an LTE uplink channel, other known LTE uplink channels or NR uplink channels, that are not yet used for transmission in a time period of the NR uplink channel or a time period of the LTE uplink channel, may be analyzed chronologically to determine whether the uplink channels overlap in time.

In a case that the uplink channels do not overlap, proceed to processes of NR transmission power allocation and LTE transmission power allocation. In a case that the uplink channels overlap, steps S102 to S104 are performed.

The overlap in the embodiment may be overlap in time of uplink channels of different communication systems. In a case that the overlapped uplink channels are all uplink channels of a same communication system, a process of allocating transmission power in the communication system may be performed. The different communication systems may include an NR communication system and an LTE communication system. In practical applications, the different communication systems may be communication systems based on the existing or future protocols.

In an embodiment, in the step S101, after it is determined that the uplink channels overlap, with sampling points of the first uplink channel in the time domain as a granularity, a sum of transmission powers of all uplink channels that overlap in time with the first uplink channel may be calculated chronologically at each of sampling points in a time period of the first uplink channel, and it may be determined whether the sum of the transmission powers exceeds a maximum total transmission power $P_{Total}^{NSA}$ (that is, the predetermined maximum total transmission power) in the NSA operation mode.

In the time period of the first uplink channel, the types of the uplink channels overlapping at different time points may be different. For distiguishment, the "overlapping set" may be configured. An "overlapping set" includes all concurrent uplink channels at a time point. Further, the overlapping set may include a largest number of concurrent uplink channels.

Figure 2:
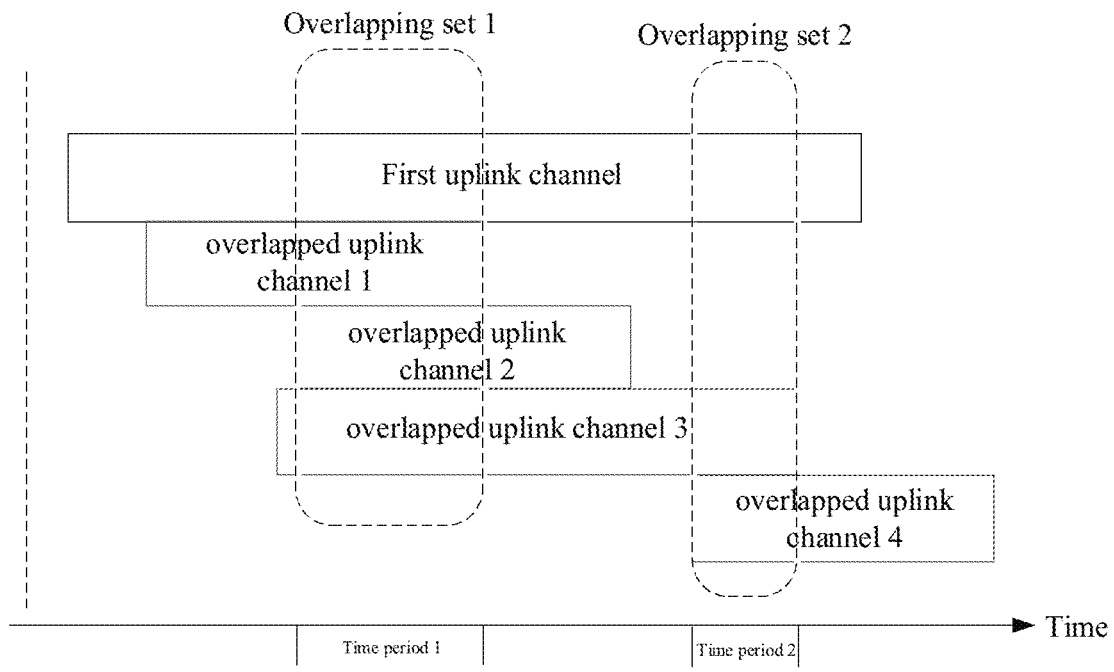
FIG. 2 is a schematic diagram showing overlapping sets according to an embodiment of the present disclosure.

For example, referring to FIG. 2, it is assumed that the first uplink channel successively overlaps with other four uplink channels (respectively denoted as an overlapping uplink channel 1, an overlapping uplink channel 2, an overlapping uplink channel 3 and an overlapping uplink channel 4) in time in an entire time period. Some of the overlapping uplink channel 1, the overlapping uplink channel 2, the overlapping uplink channel 3 and the overlapping uplink channel 4 may be NR uplink channels, and the rest of the overlapping uplink channel 1, the overlapping uplink channel 2, the overlapping uplink channel 3 and the overlapping uplink channel 4 may be LTE uplink channels.

It can be seen that according to an occupied time period of each of the uplink channels shown in FIG. 2, the first uplink channel overlaps with the overlapping uplink channel 1, the overlapping uplink channel 2 and the overlapping uplink channel 3 in a time period 1. Thus, the above four uplink channels may form "an overlapping set 1". That is, the overlapping set 1 includes three overlapping uplink channels that may be concurrent with the first uplink channel.

The first uplink channel overlaps with the overlapping uplink channel 3 and overlapping uplink channel 4 in a time period 2. Thus, the three uplink channels may form "an overlapping set 2". That is, the overlapping set 2 includes two overlapping uplink channels that may be concurrent with the first uplink channel.

A sum of uplink powers of all the uplink channels in the overlapping set 1 is calculated. In a case that the sum exceeds the maximum total transmission power $P_{Total}^{NSA}$ in the NSA operation mode, step S102 is performed.

Similarly, a sum of uplink powers of all the uplink channels in the overlapping set 2 is calculated. In a case that the sum exceeds the maximum total transmission power $P_{Total}^{NSA}$ in the NSA operation mode, step S102 is performed.

In a case that both the sum of the uplink powers of all the uplink channels in the overlapping set 1 and the sum of the uplink powers of all the uplink channels in the overlapping set 2 do not exceed the maximum total transmission power $P_{Total}^{NSA}$ in the NSA operation mode, proceed to processes of NR transmission power allocation and LTE transmission power allocation.

In an embodiment, in the step S102, priorities and power adjustment coefficients of the NR uplink channels and the LTE uplink channels may be determined based on system simulation, scenarios or the like. The following requirements should be met. The connection performance of an NR link in an RRC connection state should be reduced without affecting the connection performance of an LTE link in an RRC connection state.

Specifically, priorities of the uplink channels are related to channel types, information carried in uplink signals, carrier types, periods, and the like of the uplink channels. For example, in a case of initial access or uplink out-of-synchronization, it is required to transmit through a PRACH to perform uplink synchronization with a network side, thus the PRACH has a highest priority.

In the step S102, the priorities of the uplink channels may be determined by determining that a PRACH has a highest priority, a PUCCH has a second highest priority and a PUSCH has a lowest priority.

In the step S102, the priorities of the uplink channels may be determined by determining that an uplink channel on which an uplink signal carries a Hybrid Automatic Repeat request (HARQ) acknowledge (ACK) message (HARQ-ACK message) and/or an uplink Scheduling Request (SR) has a highest priority, an uplink channel on which an uplink signal carries Channel State Information (CSI) has a second highest priority, and an uplink channel on which an uplink signal carries none of the HARQ-ACK, the uplink scheduling request and the CSI has a lowest priority.

In the step S102, the priorities of the uplink channels may be determined by determining that an aperiodic uplink channel has a highest priority, a semi-static uplink channel has a second highest priority, and a static uplink channel has a lowest priority.

In the step S102, the priorities of the uplink channels may be determined by determining that an uplink channel corresponding to a primary cell (PCell) in carrier aggregation (CA) has a highest priority, an uplink channel corresponding to a primary-secondary cell (PSCell) in carrier aggregation has a second highest priority, and an uplink channel corresponding to a secondary cell (SCell) in carrier aggregation has a lowest priority.

For example, the following Table 1 shows some of NR uplink channels and LTE uplink channels sorted based on priorities:

| Number | Priorities of uplink channels (descending order) |
|---|---|
| 1 | LTE PRACH@PCell |
| 2 | NR PRACH@PCell |
| 3 | LTE PUCCH with HARQ-ACK&/SR |
| 4 | LTE PUSCH with HARQ-ACK |
| 5 | NR PUCCH with HARQ-ACK&/SR |
| 6 | NR PUSCH with HARQ-ACK |
| 7 | LTE PUCCH/PUSCH with CSI |
| 8 | NR PUCCH/PUSCH with CSI |
| 9 | LTE PUSCH without HARQ-ACK/CSI |
| 10 | NR PUSCH without HARQ-ACK/CSI |
| ... | ... |

As shown in Table 1, in the EN-DC scenario, the priorities from high to low are: an LTE PRACH in a primary cell (LTE PRACH@PCell); an NR PRACH in the primary cell (NR PRACH@PCell); an LTE PUCCH configured in a primary cell and on which an uplink signal carrying an HARQ-ACK and/or a SR (LTE PUCCH with HARQ-ACK &/SR); an LTE PUSCH configured in a primary cell and on which an uplink signal carrying an HARQ-ACK (LTE PUSCH with HARQ-ACK); an NR PUCCH configured in a primary cell and on which an uplink signal carrying an HARQ-ACK and/or an SR (NR PUCCH with HARQ-ACK &/SR); an NR PUSCH configured in a primary cell and on which an uplink signal carrying an HARQ-ACK (NR PUSCH with HARQ-ACK); an LTE PUCCH or an LTE PUSCH configured in a primary cell and on which an uplink signal carrying CSI (LTE PUCCH/PUSCH with CSI); an NR PUCCH or an NR PUSCH configured in a primary cell and on which an uplink signal carrying CSI (NR PUCCH/PUSCH with SCI); an LTE PUSCH configured in a primary cell and on which an uplink signal not carrying an HARQ-ACK and CSI (LTE PUSCH without HARQ-ACK/CSI); and an NR PUSCH configured in a primary cell and on which an uplink signal not carrying an HARQ-ACK and CSI (NR PUSCH without HARQ-ACK/CSI).

According to the above priorities, the priorities of the uplink channels configured in the primary secondary cells may be determined from line 11 based on the priorities of lines 1 to 10, and then the priorities of the uplink channels configured in the secondary cells may be determined.

In an embodiment, the step S102 may further include: for uplink channels having a same channel type, same information carried in uplink signals, a same carrier type and/or a same period, determining priorities of the uplink channels based on a scenario in which a current uplink transmission scenario is performed. The scenario includes an NE-DC scenario and an EN-DC scenario.

In the NE-DC scenario, for multiple uplink channels having a same channel type, same information carried in uplink signals, a same carrier type and/or a same period, it is determined that priorities of uplink channels of the NR communication system in the multiple uplink channels are higher than priorities of uplink channels of the LTE communication system in the multiple uplink channels.

In the EN-DC scenario, for multiple uplink channels having a same channel type, same information carried in uplink signals, a same carrier type and/or a same period, it is determined that priorities of uplink channels of the LTE communication system in the multiple uplink channels are higher than priorities of uplink channels of the NR communication system in the multiple uplink channels.

For example, Table 1 shows uplink channels sorted based on priorities in the EN-DC scenario. In the EN-DC scenario, the LTE communication system is mainly used, and the connection performance of the LTE link is important. Therefore, for the NR uplink channels and the LTE uplink channels with the same channel type, the same information carried in the uplink signal, the same carrier type and the same period shown in in Table 1, the priorities of the NR uplink channels are lower than the priorities of the LTE uplink channels.

For another example, in the NE-DC scenario, since the connection performance of the NR link is important, the NR uplink channels have higher priorities than the LTE uplink channels. For example, for an LTE PRACH and an NR PRACH in a primary cell, the NR PRACH in the primary cell has a higher priority than the LTE PRACH in the primary cell in the NE-DC scenario.

In an embodiment, in the step S103, an NR uplink power adjustment coefficient and an LTE uplink power adjustment coefficient are adjusted to perform optimal power allocation and reduce the sum of powers to the maximum total transmission power $P_{Total}^{NSA}$ in the NSA operation mode.

Specifically, in the NSA operation mode, an NR uplink channel may be represented as $CH_{NR}$, an original calculated value of an uplink power (that is, an uplink transmission power) of the NR uplink channel is represented as $P_{NR}$ ($CH_{NR}$), and the NR power adjustment coefficient is represented as $\alpha_{NR}(CH_{NR})$, where $0 \leq \alpha_{NR}(CH_{NR}) \leq 1$; and an LTE uplink channel is represented as $CH_{LTE}$, an original calculated value of an uplink power (that is, an uplink transmission power) of the LTE uplink channel is represented as $P_{LTE}(CH_{LTE})$, and the LTE power adjustment coefficient is represented as $\alpha_{LTE}(CH_{LTE})$, where $0 \leq \alpha_{LTE}(CH_{LTE}) \leq 1$.

In a case that the NR uplink channel and the LTE uplink channel overlap in time, the NR power adjustment coefficient $\alpha_{NR}(CH_{NR})$ and the LTE power adjustment coefficient $\alpha_{LTE}(CH_{LTE})$ are respectively adjusted to perform optimal allocation of the NR uplink power and the LTE uplink power with considering the connection performances of both the LTE link and the NR link in the RRC connection state.

For example, the optimal allocation may be performed based on the following inequality:

$$\alpha_{NR}(CH_{NR}) \times P_{NR}(CH_{NR}) + \alpha_{LTE}(CH_{LTE}) \times P_{LTE}(CH_{LTE}) \leq P_{Total}^{NSA}$$

$$\text{where } P_{Total}^{NSA} = \begin{cases} P_{Total}^{EN-DC}, & \text{in } EN-DC \text{ scenario in } NSA \\ P_{Total}^{NE-DC}, & \text{in } NE-DC \text{ scenario in } NAS \end{cases}.$$

In a case that more than two NR uplink channels or LTE uplink channels overlap at a same time point, the above inequality may be extended as:

$$\alpha_{NR}(CH1_{NR}) \times P_{NR}(CH1_{NR}) + \ldots + \alpha_{NR}(CHn_{NR}) \times P_{NR}(CHn_{NR}) + \alpha_{LTE}(CH1_{LTE}) \times P_{LTE}(CH1_{LTE}) + \ldots + \alpha_{LTE}(CHm_{LTE}) P_{LTE}(CHm_{LTE}) \leq P_{Total}^{NSA}.$$

where n represents the number of overlapped NR uplink channels, and m represents overlapped LTE uplink channels.

In an embodiment, an uplink power of an uplink channel with a higher priority is adjusted with an adjustment amount closer to zero. That is, a power adjustment coefficient of the uplink channel with a higher priority is closer to 1.

In an embodiment, the step S103 may include: determining a remaining allocatable uplink power based on a uplink power of an uplink channel with a highest priority and the predetermined maximum total transmission power; and adjusting uplink powers of remaining uplink channels in the overlapping set except the uplink channel with the highest priority based on the remaining allocatable uplink power to control a sum of the uplink powers of the remaining uplink channels to be less than or equal to the remaining allocatable uplink power.

Further, a power adjustment coefficient of an uplink channel with a low priority may be obtained by dividing a current uplink power of the uplink channel by an original uplink power of the uplink channel.

An uplink power of an uplink channel with a lower priority is reduced more, and the uplink channel has a smaller power adjustment coefficient.

For example, it is assumed that the overlapping set includes two uplink channels: an NR PRACH configured in a primary cell and an LTE PUSCH configured in the primary cell, the LTE PUSCH does not carry an HARQ-ACK and CSI, and the sum of the uplink powers of the two uplink channels exceeds $P_{Total}^{NSA}$. Since the LTE PUSCH does not carry a signaling affecting the connection performance of the LTE link and the NR PRACH configured in the primary cell affect the connection performance of the NR uplink, it is determined based on the priorities that the uplink power of the NR PRACH remains unchanged, and the uplink power of the LTE PUSCH is reduced to a remaining power obtained by subtracting the uplink power of the NR PRACH from $P_{Total}^{NSA}$.

In an embodiment, referring to FIG. 2, multiple overlapping sets may be determined for the first uplink channel in a time period.

In a case that there are multiple overlapping sets in which a sum of uplink powers of uplink channels is greater than the predetermined maximum total transmission power, the step S103 may include: determining a minimum uplink power of the first uplink channel in adjustment results of the multiple overlapping sets as an updated uplink power of the first uplink channel.

Specifically, it is assumed that there are N overlapping sets in which the sum of the uplink powers of the uplink channels determined in the step S101 exceeds the maximum total transmission power $P_{Total}^{NSA}$, in the NSA operation mode, where N is greater than or equal to 2.

In performing the step S102, the uplink powers of the uplink channels in each of the overlapping sets may be optimally adjusted one by one based on the priorities of the NR uplink channels and the LTE uplink channels as shown in Table 1, until the uplink powers of all the uplink channels in the N overlapping sets are adjusted.

In performing the step S103, a minimum uplink power of the first uplink channel may be determined as a final uplink power of the first uplink channel from the adjustment results of the N overlapping sets after performing optimal uplink power allocation.

Further, in the same way, a minimum uplink power of another overlapped uplink channel in the overlapping set may be determined to update an uplink power of the another uplink channel.

That is, after performing the step S104, the method for allocating uplink power may further include: determining, for each of uplink channels in the multiple overlapping sets except the first uplink channel, a minimum uplink power of the uplink channel in the multiple overlapping sets as an updated uplink power of the uplink channel.

In an embodiment, the step S104 may include: determining the uplink power of the first uplink channel determined based on the adjustment result as an adjusted uplink power, and determining a ratio of the adjusted uplink power to an initial uplink power of the first uplink channel as a power adjustment coefficient of the first uplink channel; finely adjusting the power adjustment coefficient based on uplink powers of the first uplink channel in a previous time slot or subframe and a subsequent time slot or subframe to control the uplink power of the first uplink channel to change smoothly in time; and updating the uplink power of the first uplink channel based on the adjusted power adjustment coefficient.

Specifically, in a case that uplink transmission is performed on the first uplink channel in in a previous time slot or subframe and a subsequent time slot or subframe, the power adjustment coefficients of the uplink channels determined in the adjustment result may be finely adjusted based on priorities, scenarios and the like with ensuring that the sum of the powers does not exceed the maximum total transmission power $P_{Total}^{NSA}$ in the NSA operation mode, so that the uplink powers of the uplink channels corresponding to the previous time slot or subframe and the subsequent time slot or subframe change smoothly without sudden changes in time.

Therefore, with the solutions according to the embodiments of the present disclosure, in the case that there is an overlap between the NR uplink transmission signal and the LTE uplink transmission signal and the sum of the NR uplink transmission power for the overlap and the LTE uplink transmission power for the overlap exceeds the limit, the NR terminal respectively evaluates the type and the importance of the NR uplink transmission channel for the overlap and the type and the importance of the LTE uplink transmission channel for the overlap, and then optimally allocates the NR uplink transmission power and the LTE uplink transmission power. Therefore, the influence on the connection performance of the NR link in a RRC connection state can be reduced without affecting the connection performance of the LTE link in a RRC connection state.

Specifically, the uplink channels belonging to the LTE communication system and the uplink channels belonging to the NR communication system in the overlapping set are sorted based on factors such as channel types, ensuring that the uplink powers of the NR uplink channels and the uplink powers of the LTE uplink channels carrying signalings related to link connection performance can be effectively guaranteed, and thereby avoiding always reducing the connection performance of the NE link in order to ensure the connection performance of the LTE link.

Figure 3:
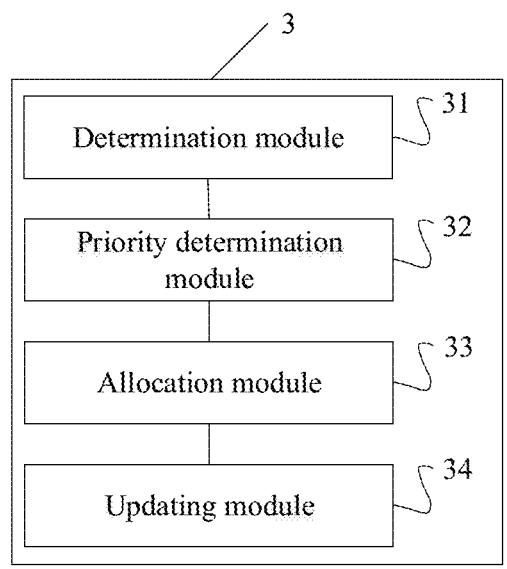
FIG. 3 is a schematic structural diagram of an apparatus for allocating uplink power according to an embodiment of the present disclosure.

FIG. 3 is a schematic structural diagram of an apparatus for allocating uplink power according to an embodiment of the present disclosure. It should be understood by those skilled in the art that the apparatus 3 for allocating uplink power according to the embodiment of the present disclosure may be used to perform the technical solutions in the method according to the embodiments shown in FIG. 1 and FIG. 2.

Referring to FIG. 3, the apparatus 3 for allocating uplink power according to the embodiment of the present disclosure may include: a determination module 31, a priority determination module 32, an allocation module 33 and an updating module 34. The determination module 31 is configured to determine an overlapping set for a first uplink channel, where the overlapping set is a set of uplink channels overlapping in time with the first uplink channel, and at least one of the uplink channels overlapping in time with the first uplink channel belongs to a different communication system from the first uplink channel. The priority determination module 32 is configured to determine priorities of the uplink channels in the overlapping set at least based on channel types, information carried in uplink signals, carrier types and periods of the uplink channels in a case that a sum of uplink powers of the uplink channels in the overlapping set is greater than a predetermined maximum total transmission power. The allocation module 33 is configured to adjust the uplink powers of the uplink channels in the overlapping set based on the priorities until the sum of the uplink powers of the uplink channels in the overlapping set is less than or equal to the predetermined maximum total transmission power, where an uplink power of an uplink channel with a lower priority is adjusted with a larger adjustment amount. The updating module 34 is configured to update an uplink power of the first uplink channel based on an adjustment result.

For the operation principle and the operation mode of the apparatus 3 for allocating uplink power, one may refer to the descriptions of the embodiments shown in FIG. 1 and FIG. 2, which are not repeated herein.

In implementation, the apparatus for allocating uplink power may corresponds to a chip with a power allocation function in a user device; or a chip with a data processing function, such as a system-on-a-chip (SOC) and a baseband chip; or a chip module including a chip with an XX function; or a chip module including a chip with a data processing function; or a user device.

In implementation, modules/units included in the apparatuses and the products described in the above embodiments may be software modules/units, hardware modules/units, or partly software modules/units and partly hardware modules/units.

For example, for the apparatuses or the products applied to or integrated in a chip, modules/units included therein may be implemented by hardware such as circuits, or at least some of the modules/units may be implemented by a software program executed on the processor integrated inside the chip, and the remaining (if any) part of the modules/units may be implemented by hardware such as circuits. For the apparatuses or the products applied to or integrated in a chip module, modules/units included therein may be implemented by hardware such as circuits, and different modules/units may reside in the same component (such as a chip and a circuit module) or in different components of the chip module. Alternatively, at least some of the modules/units may be implemented by software programs executed on the processor integrated inside the chip module. The remaining (if any) part of the modules/units may be implemented by hardware such as circuits. For the apparatus or the products applied to or integrated in a terminal, all of modules/units included therein may be implemented in hardware such as circuits, and different modules/units may reside in the same component (such as a chip and a circuit module) or in different components in the terminal. Alternatively, at least some of the modules/units may be implemented by software programs executed on the processor integrated inside the terminal, and the remaining (if any) part of the modules/units may be implemented in hardware such as circuits.

A storage medium is further provided according to an embodiment of the present disclosure. The storage medium stores computer instructions. The computer instructions, when executed, perform the technical solutions in the method according to the embodiments shown in FIG. 1 and FIG. 2. Preferably, the storage medium may include a computer-readable storage medium such as a non-volatile memory or a non-transitory memory. The storage medium may include an ROM, an RAM, a magnetic disk, an optical disk, or the like.

A terminal is further provided according to an embodiment of the present disclosure. The terminal includes the apparatus 3 for allocating uplink power shown in FIG. 3. Alternatively, the terminal may include a processor and a memory. The memory stores computer instructions that are executable on the processor. The processor, when executing the computer instructions, to perform the technical solutions in the method according to the embodiments shown in FIG. 1 and FIG. 2. The terminal may be an NR terminal, and the NR terminal includes but is not limited to a mobile phone and the like.

Although the present disclosure is disclosed above, the present disclosure is not limited thereto. Various changes and modifications may be made by those skilled in the art without departing from the spirit and scope of the present disclosure. Therefore, the protection scope of the present disclosure should be based on the scope defined by the claims.

The invention claimed is:

1. A method for allocating uplink power, comprising:
   determining an overlapping set for a first uplink channel to be used for transmission, wherein the overlapping set is a set of uplink channels overlapping in time with the first uplink channel, and at least one of the uplink channels overlapping in time with the first uplink channel belongs to a different communication system from the first uplink channel;

determining priorities of the uplink channels in the overlapping set at least based on channel types, information carried in uplink signals, carrier types and periods of the uplink channels in a case that a sum of uplink powers of the uplink channels in the overlapping set is greater than a predetermined maximum total transmission power;

adjusting the uplink powers of the uplink channels in the overlapping set based on the priorities until the sum of the uplink powers of the uplink channels in the overlapping set is less than or equal to the predetermined maximum total transmission power, wherein an uplink power of an uplink channel with a lower priority is adjusted with a larger adjustment amount; and updating an uplink power of the first uplink channel based on an adjustment result;

wherein said adjusting the uplink powers of the uplink channels in the overlapping set based on the priorities until the sum of the uplink powers of the uplink channels in the overlapping set is less than or equal to the predetermined maximum total transmission power comprises:

determining a remaining allocatable uplink power based on an uplink power of an uplink channel with a highest priority and the predetermined maximum total transmission power; and adjusting uplink powers of remaining uplink channels in the overlapping set except the uplink channel with the highest priority based on the remaining allocatable uplink power to control a sum of the uplink powers of the remaining uplink channels to be less than or equal to the remaining allocatable uplink power.

2. The method for allocating uplink power according to claim 1, wherein an uplink power of an uplink channel with a higher priority is adjusted with an adjustment amount closer to zero.

3. The method for allocating uplink power according to claim 1, wherein in a case that there are a plurality of overlapping sets in which a sum of uplink powers of uplink channels is greater than the predetermined maximum total transmission power, the adjusting the uplink powers of the uplink channels in the overlapping set based on the priorities until the sum of the uplink powers of the uplink channels in the overlapping set is less than or equal to the predetermined maximum total transmission power comprises:

determining a minimum uplink power of the first uplink channel in adjustment results of the plurality of overlapping sets as an updated uplink power of the first uplink channel.

4. The method for allocating uplink power according to claim 3, further comprising:

determining, for each of uplink channels in the plurality of overlapping sets except the first uplink channel, a minimum uplink power of the uplink channel in the plurality of overlapping sets as an updated uplink power of the uplink channel.

5. The method for allocating uplink power according to claim 1, wherein the determining priorities of the uplink channels in the overlapping set at least based on channel types, information carried in uplink signals, carrier types and periods of the uplink channels comprises:

determining that a PRACH has a highest priority, a PUCCH has a second highest priority and a PUSCH has a lowest priority;

determining that an uplink channel on which an uplink signal carries an HARQ-ACK and/or an uplink scheduling request has a highest priority, an uplink channel on which an uplink signal carries CSI has a second highest priority, and an uplink channel on which an uplink signal carries none of the HARQ-ACK, the uplink scheduling request and the CSI has a lowest priority;

determining that an aperiodic uplink channel has a highest priority, a semi-static uplink channel has a second highest priority, and a static uplink channel has a lowest priority; and determining that an uplink channel corresponding to a primary cell in carrier aggregation has a highest priority, an uplink channel corresponding to a primary-secondary cell in carrier aggregation has a second highest priority, and an uplink channel corresponding to a secondary cell in carrier aggregation has a lowest priority.

6. The method for allocating uplink power according to claim 5, wherein the determining priorities of the uplink channels in the overlapping set at least based on channel types, information carried in uplink signals, carrier types and periods of the uplink channels further comprises:

for uplink channels having a same channel type, same information carried in uplink signals, a same carrier type and/or a same period, determining priorities of the uplink channels based on a scenario in which a current uplink transmission scenario is performed, wherein the scenario comprises an NE-DC scenario and an EN-DC scenario.

7. The method for allocating uplink power according to claim 6, wherein the determining priorities of the uplink channels based on a scenario in which a current uplink transmission is performed comprises:

for the uplink channels having the same channel type, the same information carried in the uplink signals, the same carrier type and/or the same period, determining that a priority of an uplink channel belonging to an NR communication system in the uplink channels is higher than a priority of an uplink channel belonging to an LTE communication system in the uplink channels in a case that the scenario in which the current uplink transmission is performed is the NE-DC scenario; and determining that a priority of an uplink channel belonging to an LTE communication system in the uplink channels is higher than a priority of an uplink channel belonging to an NR communication system in the uplink channels in a case that the scenario in which the current uplink transmission is performed is the EN-DC scenario.

8. The method for allocating uplink power according to claim 1, wherein the updating an uplink power of the first uplink channel based on an adjustment result comprises:

determining the uplink power of the first uplink channel determined based on the adjustment result as an adjusted uplink power, and determining a ratio of the adjusted uplink power to an initial uplink power of the first uplink channel as a power adjustment coefficient of the first uplink channel;

finely adjusting the power adjustment coefficient based on uplink powers of the first uplink channel in a previous time slot or subframe and a subsequent time slot or subframe to control the uplink power of the first uplink channel to change smoothly in time; and updating the uplink power of the first uplink channel based on the adjusted power adjustment coefficient.

9. An apparatus for allocating uplink power, comprising:

a determination module, configured to determine an overlapping set for a first uplink channel, wherein the overlapping set is a set of uplink channels overlapping in time with the first uplink channel, and at least one of the uplink channels overlapping in time with the first uplink channel belongs to a different communication system from the first uplink channel;

a priority determination module, configured to determine priorities of the uplink channels in the overlapping set at least based on channel types, information carried in uplink signals, carrier types and periods of the uplink channels in a case that a sum of uplink powers of the uplink channels in the overlapping set is greater than a predetermined maximum total transmission power;

an allocation module, configured to adjust the uplink powers of the uplink channels in the overlapping set based on the priorities until the sum of the uplink powers of the uplink channels in the overlapping set is less than or equal to the predetermined maximum total transmission power, wherein an uplink power of an uplink channel with a lower priority is adjusted with a larger adjustment amount; and an updating module, configured to update an uplink power of the first uplink channel based on an adjustment result;

wherein the allocation module is further configured to:
  determine a remaining allocatable uplink power based on an uplink power of an uplink channel with a highest priority and the predetermined maximum total transmission power; and
  adjust uplink powers of remaining uplink channels in the overlapping set except the uplink channel with the highest priority based on the remaining allocatable uplink power to control a sum of the uplink powers of the remaining uplink channels to be less than or equal to the remaining allocatable uplink power.

10. A storage medium storing computer instructions, wherein the computer instructions, when executed by a processor, cause the processor to perform the method according to claim 1.

11. A terminal, comprising the apparatus for allocating uplink power according to claim 9.

12. A terminal, comprising a processor and a memory, wherein
  the memory stores computer instructions that are executable on the processor, and
  the processor is configured, when executing the computer instructions, to perform the method according to claim 1.

* * * * *